Dec. 26, 1939. T. PRATT 2,184,755
ELECTRICAL LIQUID LEVEL INDICATING DEVICE
Filed Jan. 19, 1937
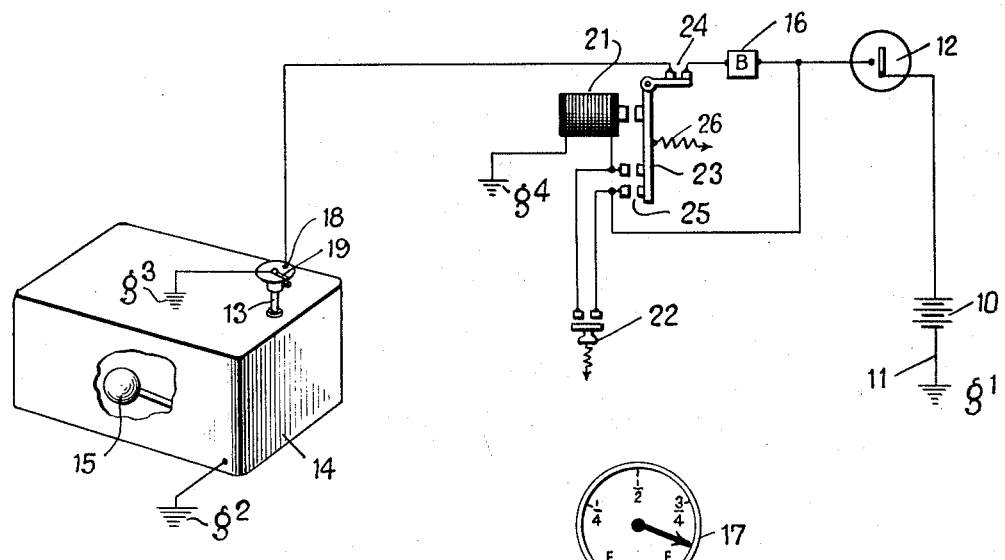
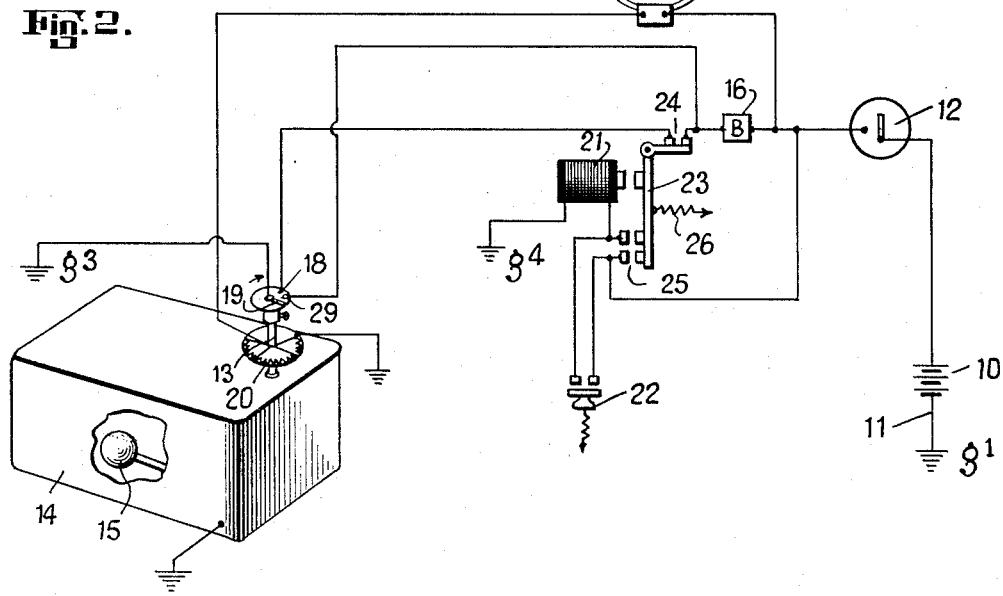
INVENTOR.
Theodore Pratt
BY
Emery, Varney, Whittemore & Dix.
ATTORNEYS.

Patented Dec. 26, 1939

2,184,755

UNITED STATES PATENT OFFICE 2,184,755

ELECTRICAL LIQUID LEVEL INDICATING DEVICE

Theodore Pratt, Glen Cove, N. Y.

Application January 19, 1937, Serial No. 121,262

7 Claims. (Cl. 177—311)

This invention relates to electrical liquid level indicating devices and has for an object the provision of improvements in this art.

More particularly, it is an object of the invention to provide in connection with a constant reading liquid level indicator, an alarm which will give a visual, audible or other peremptory warning when the liquid reaches a predetermined level. Also to provide means for rendering said alarm inoperative at the will of an operator and to restore said alarm to operation upon the happening of a predetermined event even though the operator controlled element has been actuated to render the alarm inoperative.

In the field of automotive vehicles, to which the invention is thought to be particularly applicable, there have been numerous devices designed to indicate to the driver the amount of gasoline in the tank of the car. A common method of initiating the indication is by a float controlled switch which may, for example, engage a series of rheostat contacts in response to movements of the float. The indicator or gauge on the dashboard of the car is connected with and furnishes readings in accordance with the position of the float controlled switch.

Many of these liquid level indicating devices have been provided with means for giving an alarm when the liquid reached a predetermined lower level. For example, a buzzer or light might be set into operation to forcibly call the driver's attention to the fact that the gasoline tank needed refilling.

By providing means for rendering the alarm inoperative according to the present invention the annoyance caused by constant operation of the alarm is avoided. However, the driver may shut off the motor after rendering the alarm inoperative. In this case he would normally forget that the alarm had been given when he next started the motor. By the means provided by the present invention the alarm is again operated when the motor is started again thereby giving the driver a renewed warning to refill the tank.

Or it may happen that the driver will turn off the alarm and continue driving without remembering to buy gasoline. Inasmuch as the dashboard indicator in most cases will no longer register and the alarm has been rendered inoperative, the driver would have no further reminder of the depletion of the gasoline supply and would very likely run until the tank was completely empty. In order to avoid this situation the present invention provides means for giving a renewed alarm when the gasoline reaches an emergency level below the warning level at which the alarm first operates.

In any event when the tank is refilled the alarm is rendered inoperative.

In this automotive vehicle field it is to be understood that the field includes the passenger car, trucks, tractors, and any type of apparatus that includes and uses an internal combustion engine, whether the apparatus is movable or not. The invention herein thus pertains to an internal combustion engine system which includes all of the associated parts that are needed in the operation of these engines. Also, Diesel engines are considered as coming within the automotive field as herein indicated or defined.

With the above objects, features and advantages in mind, a specific embodiment will now be described to furnish an understanding of the principles of the invention, reference being made to the accompanying drawing wherein:

Fig. 1 is a schematic view of apparatus embodying the invention; and

Fig. 2 is a similar view of a slightly amplified form.

Referring to the drawing, the numeral 10 indicates a battery which is connected by a lead 11 to a ground g1. A master switch is designated by the numeral 12. When the device is applied to automobiles this may be associated with the ignition switch of the car so as to be operated therewith.

A float operated shaft or other member 13 is associated with the tank 14 containing the fluid to be measured. The float for operating the member 13 is indicated by the numeral 15. Mechanisms by which the float may control the member 13 are well known so need not be illustrated. The tank is grounded as at g2.

Either the alarm 16, such as a buzzer, bell, light or the like, or a constant reading indicator 17, such as that usually found on the dashboard of an automobile or both, may be employed in connection with the float controlled member 13 to inform the driver as to the amount or depletion of liquid in the tank.

The alarm circuit may comprise a conductor terminal 18 adapted to be engaged by a grounded float operated arm 19. This may be referred to as the warning alarm circuit.

One side of the indicator 17, when used, is connected to the float controlled contact member such as a rheostat 20 (Fig. 2). The other side of the indicator is connected to the line side of the battery circuit. This indicator therefore gives a constant reading of the amount of fluid in the tank, changes on the rheostat producing corresponding changes in the deflection of the indicator needle. By having the indicator scale marked off in gallons or fractions of a tank-full in the usual manner, the amount of fluid in the tank can be determined at any time. The other side of the rheostat is connected to ground at g3.

With the circuit as so far described the alarm will be operated when the liquid in the tank reaches a predetermined level. If nothing else were provided the alarm would continue to operate until the tank was refilled. However, this may be objectionable so means are hereby provided for rendering the alarm inoperative.

As herein shown, this means comprises a relay 21 grounded at g4 and connectible through a push button switch 22 with the line side of the battery circuit ahead of the alarm device. When the push button switch is closed it causes the relay or magnet 20 to move an armature 23 to open the alarm circuit at switch 24 and close the holding circuit of the relay 21 at switch 25. The alarm circuit is therefore kept open so long as current flows through the relay coils. This will continue so long as the master switch 12 is closed, that is in the case of an automobile, normally so long as the motor is kept running.

When the switch 12 is opened, as when the motor of the car is stopped, the relay coils are deenergized and the armature moves back to its alarm operating position either by the action of gravity or of a spring 26. The alarm, however, is not operated because the main circuit is open at the switch 12. But when the switch 12 is again closed, as when the car motor is again started, the alarm will immediately be operated to give a renewed warning to refill the tank. The push button switch may again be operated to disconnect the alarm if desired.

It may happen that the operator will forget to refill the tank and continue to use liquid therefrom without opening the switch 12. That is, in the case of an automobile, he may continue driving and run completely out of gasoline. To obviate this difficulty, there is provided means for repeating the alarm indication, preferably in a permanent way so that it cannot be discontinued by operation of the push button switch. The means herein shown for this purpose comprise a conductor contact 29 below the warning contact 18 and a conductor 30 connected between the alarm device 16 and the switch 24. This may be referred to as the emergency alarm circuit. The contact 29 is placed below the contact 18 in the direction of emptiness of the tank but may be so disposed that when the emergency alarm is operated there will still be a small amount of liquid in the tank. When the operator finds that the alarm cannot be rendered inoperative by actuation of the push button he will know that the tank must be refilled immediately or it will be completely empty. Opening of the switch 12 will, of course, render the alarm inoperative.

The operation of the device has been taken up throughout the description so no summary of operation is believed to be necessary. It will thus be seen that a very simple, reliable and inexpensive device has been provided for giving a warning alarm when liquid in a tank reaches a predetermined point. A low point is referred to but the same means would indicate a high point or level. In conjunction with the alarm, means are provided for rendering the alarm inoperative. Also means are provided for again rendering the alarm operative when a master switch is closed after having once been opened. And finally means are provided for again rendering the alarm operative, preferably permanently in this case, when the liquid in the tank is further depleted.

If desired, means may be provided for adjusting the position of one or both of the alarm contacts 18 and 29 in respect to the movement of arm 19, thus permitting choice in the amount of liquid to be left in the container when the alarm is operated. Any of the well known adjustable mountings for the contacts 18 and 29 on the support may be employed. Such mountings will allow these contacts to be positioned as desired.

While certain embodiments of the invention have been described in detail to illustrate the principles of the invention it is to be understood that the invention is not so limited but may be variously embodied within the limits of the prior art and the scope of the subjoined claims.

I claim:

1. In an internal combustion engine system, an engine, a fuel container for holding fuel for said engine, means operable in response to the level of fuel in the container for affecting an electrical contact when the fuel reaches a predetermined level, an electric circuit including said contact and an alarm, a relay for controlling said circuit, manually controlled means for operating said relay to change said circuit and render said alarm inoperative, means for holding said relay in the operated position in which said alarm is rendered inoperative after said change, and a main control switch for rendering all of said means including said relay holding means inoperative, whereby when said main control switch is operated to the off position and again placed in the on position said alarm will again be operated.

2. A liquid level indicating device, comprising in combination, an alarm device, means responsive to the level of a body of liquid for actuating said alarm device when the liquid reaches a predetermined level, said means comprising an electrical circuit including a master switch and a magnet-controlled switch, a magnet for opening said magnet-controlled switch when energized and allowing the switch to be closed when deenergized, manually operated control means for energizing said magnet, and means operative when said magnet is energized for continuing the circuit through said magnet to maintain the magnet energized after said manually operated control means has been released to maintain the alarm device inoperative while current continues to flow in said circuit when said master switch is closed, said alarm device being automatically again operated when said master switch is closed after having been opened when the liquid remains below the predetermined level.

3. Apparatus as set forth in claim 2 which further comprises in combination, means responsive to the level of the liquid independent of said magnet controlled switch for actuating said alarm device when the liquid reaches a second predetermined level, whereby the alarm device is continuously operated at all times when said master switch is closed.

4. A liquid level indicating device for automobiles, comprising in combination, a liquid container, a float, an electrical circuit including an ignition switch, an alarm device, and an alarm switch, means associated with said float for closing said circuit and operating said alarm device when the liquid falls to a predetermined level, a spring normally holding said alarm switch closed, a magnet and manual control means for opening the alarm switch to stop the operation of the alarm, means including a holding circuit for retaining said alarm switch in open position while said ignition switch remains closed but allowing said alarm switch to close and remain closed when said ignition switch is turned off, said alarm device again being operable when said ignition switch is again closed.

5. A liquid level indicating device, comprising in combination, an electrical circuit including an alarm device, a master switch, an alarm control switch and means responsive to the level of liquid for operating said alarm device when the liquid reaches a predetermined level, manually operated control means for rendering said alarm device inoperative while current continues to flow through part of said circuit, and means for again operating said alarm device and maintaining it in operation independently of said manually operated control means when the liquid reaches a more advanced predetermined level while changing in the same direction, said alarm in either case being rendered inoperative when said master switch is opened and being again rendered operative in either case when the master switch is again closed after having been opened.

6. In an internal combustion engine system, an engine, a fuel container for holding the fuel for said engine, an electrical circuit including an alarm and an electrical contact, means operable in response to the level of the fuel in said container for closing said electrical circuit and setting said alarm into operation, a second electrical circuit, a relay and a switch included in said second circuit for controlling said second circuit, said second circuit connected to said first circuit to render said alarm inoperative when said second circuit switch is operated to close said second circuit, said relay being normally urged to non-operative position and returning to the non-operative position when said first circuit is opened thereby allowing said alarm to be operated when said first circuit is again closed.

7. In an internal combustion system an engine, a container for holding the fuel for said engine, a float in said container responsive to the level of said fuel, a swinging arm adapted to be moved by the movement of the float on the gasoline, an electrical circuit including a warning alarm, an ignition switch, a contact adapted to be engaged by said arm when the fuel reaches a predetermined level, the closing of said ignition switch placing said circuit in condition to operate said alarm when said arm engages said contact, a supplemental circuit for shunting the warning alarm, said supplemental circuit having a manually-operated switch and a relay therein for completing said circuit and rendering said alarm inoperative, a second contact in said first electrical circuit for engagement with said arm at a lower level of the gasoline, said second contact on being engaged by said arm again placing said alarm in operation while said supplemental circuit is maintained closed.

THEODORE PRATT.